United States Patent
Behnke et al.

[11] Patent Number: 5,876,775
[45] Date of Patent: Mar. 2, 1999

[54] TOPICAL COATING APPLYING APPARATUS AND METHODS

[75] Inventors: Ronald J. Behnke; Derek D. Dawes; Gregory L. Godsey, all of Cedar Rapids, Iowa; Ronald D. Hurd, Minnetonka, Minn.; John G. Roufs, Maple Grove, Minn.; Gary C. Veenhuis, Albertville, Minn.

[73] Assignee: General Mills, Inc., Minneapolis, Minn.

[21] Appl. No.: 776,847

[22] PCT Filed: May 26, 1995

[86] PCT No.: PCT/US95/06433

§ 371 Date: Jan. 24, 1997

§ 102(e) Date: Jan. 24, 1997

[87] PCT Pub. No.: WO95/34224

PCT Pub. Date: Dec. 21, 1995

Related U.S. Application Data

[63] Continuation-in-part of Ser. No. 259,709, Jun. 14, 1994, Pat. No. 5,453,383.

[51] Int. Cl.[6] ........................................ A23G 3/26
[52] U.S. Cl. ..................... 426/302; 426/72; 426/103; 426/96; 426/455; 476/474; 476/476; 118/19; 118/24; 427/422; 99/516
[58] Field of Search ................... 426/103, 302, 426/72, 307, 310, 474, 476, 96, 455; 118/19, 24, 417; 427/422; 99/516, 534

[56] References Cited

U.S. PATENT DOCUMENTS

| | | | |
|---|---|---|---|
| 1,292,351 | 4/1919 | Jones et al. | 239/100 |
| 1,374,938 | 4/1921 | McNulty | 118/19 |

(List continued on next page.)

FOREIGN PATENT DOCUMENTS

| | | |
|---|---|---|
| 2083773 | 6/1993 | Canada . |
| 1332121 | 9/1994 | Canada . |
| 0 192 865 | 3/1986 | European Pat. Off. . |
| 0 237 352 | 9/1987 | European Pat. Off. . |

(List continued on next page.)

OTHER PUBLICATIONS

Article, Popular Mechanics, May 1993, p. 57, "Airless Sprayer".

"Breakfast Cereals and How They Are Made," ed. by Robert B. Fast and Elwood F. Caldwell, American Association of Cereal Chemists, Inc., 1990, pp. 195–220.

"New Spray Nozzles Can Wash Problems Away," Food Processing, Jul. 1994, pp. 55–59.

*Primary Examiner*—Milton Cano
*Attorney, Agent, or Firm*—John A. O'Toole; L. MeRoy Lillehaugen; Alan D. Kamrath

[57] ABSTRACT

An enrober (100) for applying a topical coating to an exterior surface of multiple pieces of a food base is disclosed having a marked decrease in the amount of build-up upon the internal surface of the drum (102) allowing for reductions in cleaning service requirements and its concomitant losses in production capacity and for reductions in undesirable product agglomerates. In the preferred form, the drum (102) is formed by a thin wall in a generally cylindrical shape and formed of hydrophobic material in the form of high-density polyethylene having low-stick characteristics with the topically coated food base. Moisture, in addition to any present in the topical coating, is added to the drum (102) to prevent or practically eliminate build-up on the drum (102). The topical coating in the form of a slurry can be co-sprayed with steam in an atomized intermixed spray onto the food base by a nozzle (10, 80). Also, a renewable barrier between the continuous inner surface of the drum (102) and the food base can be formed by spraying water or steam by nozzles (116) as a thin film of water onto the inner surface of the drum (102) above the food base.

23 Claims, 7 Drawing Sheets

U.S. PATENT DOCUMENTS

| | | | |
|---|---|---|---|
| 2,335,116 | 11/1943 | Hensen | 239/415 |
| 2,513,081 | 6/1950 | Clark et al. | 239/307 |
| 2,726,959 | 12/1955 | Lushbough et al. | 476/307 X |
| 2,915,024 | 12/1959 | Krüger et al. | 118/24 X |
| 2,991,015 | 7/1961 | Standlick | 239/127 |
| 3,157,361 | 11/1964 | Heald | 239/427 |
| 3,199,790 | 8/1965 | Giesemann | 239/428 |
| 3,470,831 | 10/1969 | Von Drachenfels | 118/24 X |
| 3,557,717 | 1/1971 | Chivers | 426/474 X |
| 3,587,974 | 6/1971 | Rosenkranz | 239/433 X |
| 3,615,676 | 10/1971 | McKown | 99/83 |
| 3,623,669 | 11/1971 | Woods | 239/307 |
| 3,677,808 | 7/1972 | Sheridan | 106/660 |
| 3,748,150 | 7/1973 | Fulger | 426/96 |
| 3,976,793 | 8/1976 | Olson et al. | 476/302 X |
| 4,032,667 | 6/1977 | Kreuter | 118/24 X |
| 4,079,151 | 3/1978 | Schade et al. | 426/96 |
| 4,093,188 | 6/1978 | Horner | 366/336 |
| 4,169,545 | 10/1979 | Decker | 222/136 |
| 4,262,847 | 4/1981 | Stitzer et al. | 239/112 |
| 4,283,012 | 8/1981 | Hanson | 118/24 X |
| 4,293,570 | 10/1981 | Vadasz | 426/103 X |
| 4,294,868 | 10/1981 | Kalbskopf et al. | 477/109 |
| 4,422,574 | 12/1983 | Mancuso, Jr. | 239/424 X |
| 4,614,490 | 9/1986 | Kiczek et al. | 431/4 |
| 4,617,872 | 10/1986 | Melliger | 118/19 |
| 4,619,843 | 10/1986 | Mutsors | 239/424 X |
| 4,645,127 | 2/1987 | Emory et al. | 239/424.5 X |
| 4,658,754 | 4/1987 | Messner et al. | 239/424 X |
| 4,668,180 | 5/1987 | Newman | 239/424 X |
| 4,676,437 | 6/1987 | Brown | 239/414 |
| 4,743,456 | 5/1988 | Spadafora et al. | 426/293 |
| 4,755,390 | 7/1988 | Calandro et al. | 426/293 |
| 4,760,956 | 8/1988 | Mansfield | 239/8 |
| 4,840,493 | 6/1989 | Horner | 366/339 |
| 4,850,705 | 7/1989 | Horner | 366/339 |
| 4,856,453 | 8/1989 | Verrico | 118/24 |
| 4,909,420 | 3/1990 | Reyner | 222/386.5 |
| 4,925,107 | 5/1990 | Brown | 239/414 |
| 4,934,445 | 6/1990 | Plata et al. | 164/486 |
| 5,005,514 | 4/1991 | Verrico | 118/16 |
| 5,012,975 | 5/1991 | Korsmeyer | 239/9 |
| 5,069,118 | 12/1991 | Berqquist et al. | 99/516 X |
| 5,219,097 | 6/1993 | Huber et al. | 222/145 |
| 5,302,201 | 4/1994 | Lücke | 118/19 |
| 5,370,734 | 12/1994 | Ierrevo | 118/24 X |
| 5,403,395 | 4/1995 | McCullough et al. | 118/19 |
| 5,453,383 | 9/1995 | Roufs et al. | 426/302 |

FOREIGN PATENT DOCUMENTS

| | | | |
|---|---|---|---|
| 985544 | 7/1951 | France . | |
| 3512923 | 11/1985 | Germany . | |
| 608 343 | 1/1979 | Switzerland . | |
| 863007 | 9/1981 | U.S.S.R. | 239/419.3 |
| 1503682 | 5/1975 | United Kingdom | 118/24 |
| 1 503 682 | 3/1978 | United Kingdom . | |
| WO92/14368 | 3/1992 | WIPO . | |

TOPICAL COATING APPLYING APPARATUS AND METHODS

CROSS REFERENCE

The present application is a continuation-in-part of U.S. application Ser. No. 08/259,709 filed Jun. 14, 1994, now U.S. Pat. No. 5,453,383.

1. Field of the Invention

The present invention is directed to a food processing apparatus and methods of using such apparatus. More particularly, the present invention is directed to an improved apparatus for applying a topical coating such as a sugar coating solution to a Ready-To-Eat breakfast cereal base using a secondary source of moisture and a plastic drum.

2. Background of the Invention

A wide variety of operations, especially food processing, involve the application of a fluid coating material. In particular, the preparation of certain presweetened Ready-To-Eat ("R-T-E") breakfast cereals involves the application of a sticky sugar coating solution or slurry to a prepared R-T-E cereal base. The wet, sugar coated R-T-E cereal is subsequently dried and packaged to form the finished product.

Conventionally, the sugar coating solution or slurry is applied to the R-T-E cereal base with conventional spray nozzles that dispense the slurry in a spray pattern using only the hydrostatic pressure of the slurry supply to form the spray. The nozzles are typically mounted within an R-T-E cereal base enrober. A good description of such coating apparatus and techniques is given in "Breakfast Cereals and How They Are Made" (edited by R. B. Fast and E. F. Caldwell), American Association of Cereal Chemists, Inc., 1990, pg. 200–220. Such an enrober is an apparatus having a rotating horizontally extending vessel or drum, generally cylindrically shaped, although the axis may be at a slight angle relative to the horizontal, frequently having a lower discharge end. The cereal base is fed at one end and is discharged at the opposite end. As the vessel rotates and as the slurry is dispensed within the enrober, the slurry is evenly applied, more or less, as the cereal is tumbled within and travels along the axis of the enrober. While useful and effective, the ease of conventional hydrostatic slurry restrictive orifice discharge nozzles has numerous disadvantages.

One disadvantage involves the gradual build-up of the slurry upon the interior of the enrober vessel. After this build-up of sugar, the enrober must be thoroughly cleaned. Depending upon a variety of factors, the cleaning operation must be conducted at least once per day and perhaps as frequently as once per operating shift. Cleaning the enrober is thus a standard element of operating hygiene that usually takes up to an hour to perform. Thus, slurry build-up requires the direct cost of maintenance servicing. More importantly, since most cereal processing lines are generally continuous, slurry build-up can cause the more significant cost of downtime of the entire cereal processing line.

Still another problem with the use of conventional restrictive orifice nozzles involves the evenness of the slurry distribution over the cereal base. Of course, an evenly distributed slurry is desired. Using conventional nozzles, improved evenness of distribution can be obtained by greater tumbling (e.g., faster rotation and/or increased residence time in the enrober). However, many R-T-E cereals, especially those in flake form, are fragile. Greater tumbling leads to the development of broken flakes or fines that subsequently must be screened out. Fines generation can lead to yield losses of up to 5% or more of the cereal line's capacity.

Still another problem is undesirable product agglomeration. Undesirable product agglomeration can be aggravated by poor slurry distribution. Undesirable product agglomeration can result in the generation of large, unattractive, hard pieces that should be screened out.

Still another benefit resides in the reduction in the amount of expensive sugar ingredients lost as part of the sugar build-up that must be washed away during enrober cleaning. Still another advantage resides in reduction in undesirable product agglomerates.

Surprisingly, dramatic improvements in the sugar solution coating of R-T-E cereal has been obtained utilizing an enrober including a drum having a hydrophobic material internal surface, steam assisted slurry nozzles and/or an air atomized, drum spray system. One benefit is a marked decrease in the amount of sugar build-up upon the enrober's interior surface that allows for reductions in cleaning service requirements and its concomitant losses in production capacity.

Still another advantage resides in reduction in undesirable product agglomerates.

BRIEF DESCRIPTION OF THE DRAWINGS

FIG. 10 is a sectional exploded view of the steam nozzle.

DESCRIPTION OF THE PREFERRED EMBODIMENT

Figure 12:
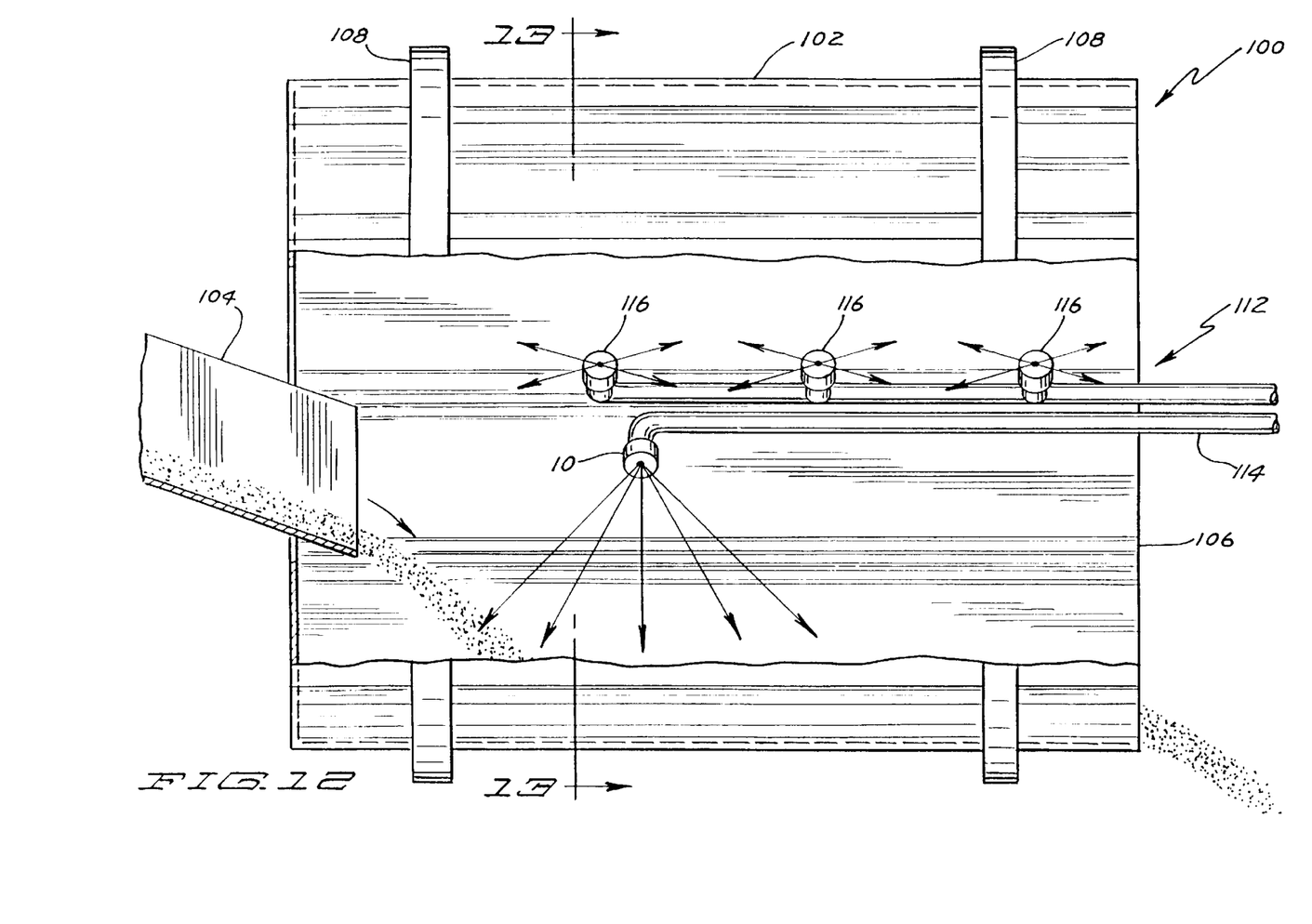
FIG. 12 is a diagrammatic side view of an enrober according to the preferred teachings of the present invention, with portions broken away to show internal construction.
Figure 13:
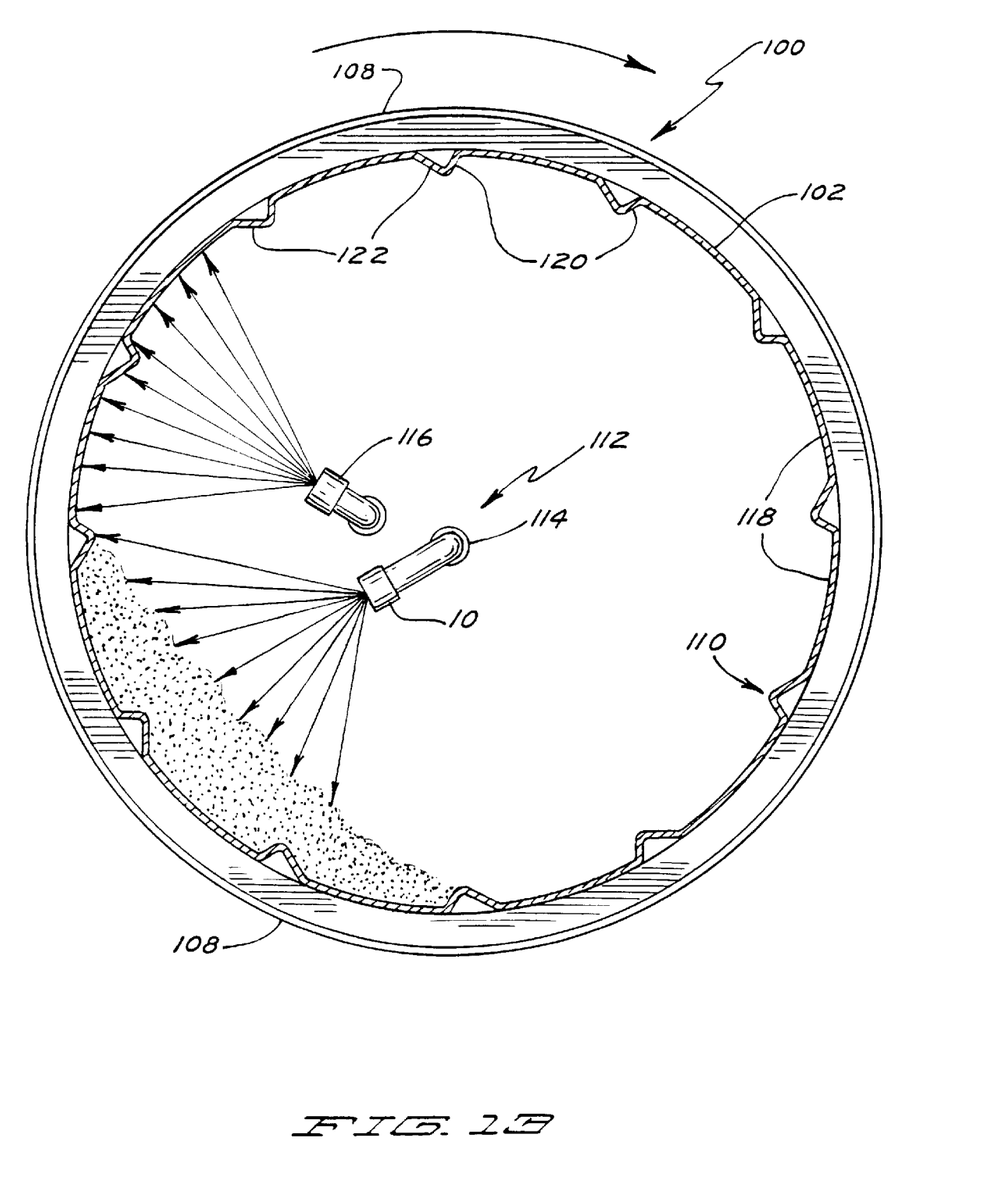
FIG. 13 is a cross sectional view of the enrober of FIG. 12 taken along lines 13—13 of FIG. 12.

An enrober according to the preferred teachings of the present invention is shown in the drawings and generally designated 100. Generally, enrober 100 includes a rotating, tumbling vessel or drum 102 which in the most preferred form is generally cylindrically shaped. Drum 102 is generally horizontal, although the axis may be at a slight angle relative to the horizontal. Dry base product to be coated is fed in one end of drum 102 such as by a delivery tube 104 and is discharged at the opposite end 106, which is frequently at a lower vertical position than the end of drum 102 including delivery tube 104. Drum 102 is rotated in any desired manner such as by two trunion rings 108 attached to the outer periphery of drum 102. The cylindrical, continuous internal surface of drum 102 is generally of two styles for differing cereal types such as for puff or flake cereals. With puff products, the internal surface is smooth whereas for flake products, the internal surface includes a plurality of circumferentially spaced, axially extending flights or lifters 110 which pick-up the cereal pieces inside of drum 102 to flip them over during rotation of drum 102. Thus, lifters 110 aid in inducing a tumbling action of the food product pieces, which in turn aids in the transfer of the topical coatings from piece-to-piece due to the pieces rubbing together.

Enrober 100 further includes a dispenser 112 for the topical coatings. Dispenser 112 includes a wand support structure 114 which extends axially through either of the ends of drum 102 and radially spaced inward of the internal surface of drum 102. Nozzles 10 can be supported on structure 114 for spraying the topical coating in a liquid state.

Figure 1:
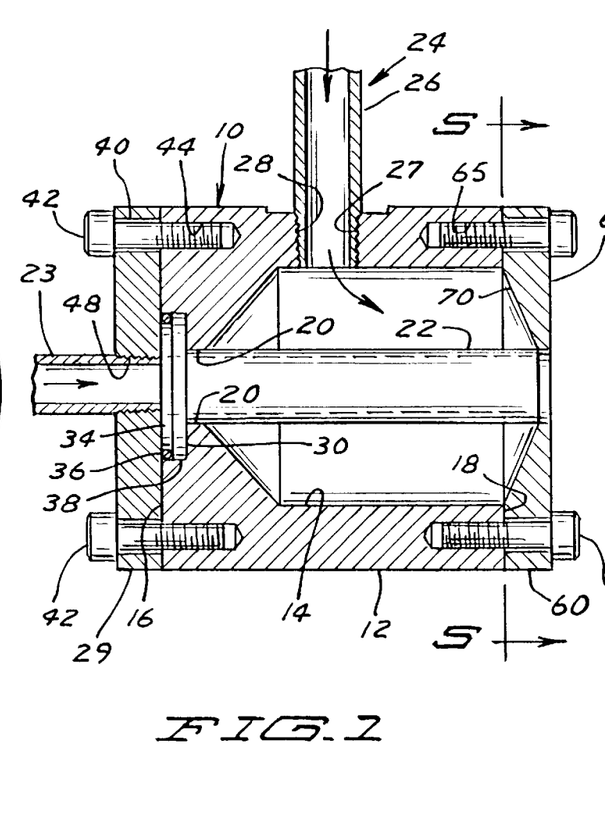
FIG. 1 is a cross sectional view taken along lines 1—1 of FIG. 2 of a first embodiment of the present steam nozzle.

In a first aspect, the invention generally resides in and provides improved sugar slurry spray nozzles 10 that additionally include a means for co-spraying a steam spray to intermix with the sugar slurry spray exterior to nozzle 10. Referring now to FIG. 1 which shows a first embodiment of the present steam nozzle 10, nozzle 10 comprises a means for spraying a sugar slurry to form a sugar slurry spray pattern and a means for co-spraying steam into a steam spray pattern into the sugar slurry spray pattern to intermix the sugar slurry spray and steam spray. Specifically, in the preferred embodiment, the nozzle 10 includes a nozzle body 12 that can be of any shape but which is conveniently cylindrical. The nozzle body 12 includes and the steam spray means can comprise an axially extending interior cavity defining a steam chamber or manifold 14, an inlet or receiving end 16 having an inlet end face, and a discharge end 18 having a discharge end face and open to the steam chamber 14. The body 12 additionally comprises at least one means for supplying a sugar slurry fluid such as an axially aligned slurry delivery member 22 having a passageway therethrough such as a tube disposed within an axially aligned bore 20 for receiving tube 22. The nozzle 10 additionally includes a steam supply 24 which can include a steam supply tube 26 screwed into receiving threads 27 of a steam inlet port 28 to provide steam continuously to the steam manifold 14. The slurry delivery tube 22 is operatively connected to a sugar coating supply (not shown) that continuously supplies the sugar slurry under modest hydrostatic pressure such as a positive displacement pump.

Figure 3:
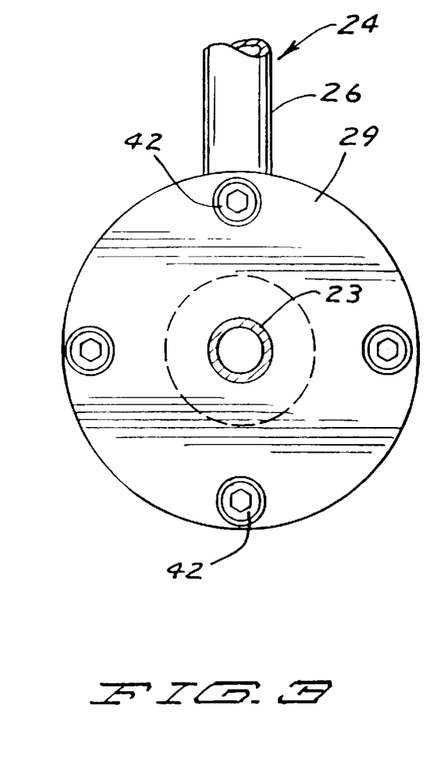
FIG. 3 is an opposed end view of the steam nozzle showing the inlet end.

FIGS. 1 and 3 further show that the nozzle 10 further includes at its receiving end a means for securing the sugar slurry tube 22 against lateral movement including a first inlet cap 29 and a first stop head 30 that abuts against a first matching shoulder 32 formed in the bore 20. As seen in FIG. 1, the nozzle 10 additionally comprises a seal means for sealing the nozzle against premature steam/slurry intermix or loss of steam at the receiving end 16 as well as from slurry leaking into the steam cavity including a second or seal head 34 including a conventional "O" ring 36 seated against a matching second shoulder 38 in the axial bore 20. The inlet cap 29 is secured in place in conventional manner such as by a plurality of screws (e.g., four or six) 42 through bores 40 in the inlet cap 29 which are screwed into threaded screw hole bores 44 in the nozzle body 12. The inlet cap 29 includes its own axial bore 48 having threads for receiving a slurry inlet supply tube 23.

Figure 2:
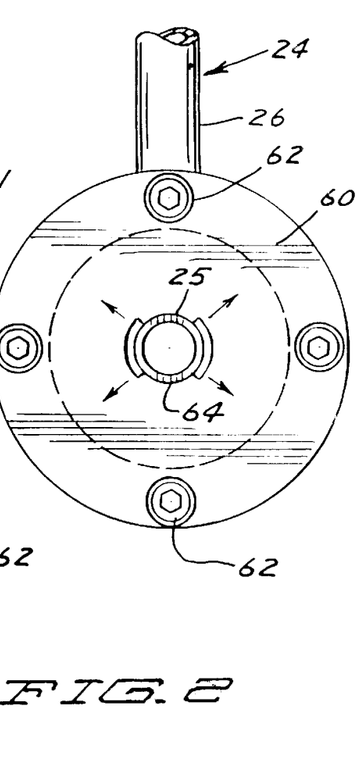
FIG. 2 is an end view of the steam nozzle showing the discharge end.

Referring now to FIG. 2, it is seen that the nozzle 10 further includes a second, discharge end means for securing the sugar slurry supply tube against lateral movement and for closing the opening in discharge end 18 to steam chamber 14 such as a discharge cap 60 having an exterior discharge face 61 secured in any conventional manner to the discharge end 18 of the nozzle body 12 such as by a plurality, (e.g., four) screws 62 through bores 63 into receiving threaded bores 65 in the nozzle body 12. Discharge cap 60 includes a central aperture 64 for receiving the slurry delivery tube 22. Additionally, the discharge cap 60 further includes at least one steam discharge orifice from the steam chamber 14 positioned proximate the central aperture 64 for the slurry discharge tube 22 such as the opposed pair of arcuate or crescent shaped slits 66 and 68.

In preferred embodiments, the steam discharge slits 66 and 68 and the slurry tube discharge end orifice 25 are co-planar, i.e., flat with the plane of the cap's discharge face 61, for improved spray pattern distribution and cleanliness. In other embodiments, either the slits or the discharge orifice 25 are recessed or extended beyond the cap discharge face 61.

The slits in highly preferred embodiments each comprise about 30° to 70°, preferably about 45° of arc spaced equally around aperture 64. While two slits are depicted, other arrangements, e.g., additional slits or holes, can also be employed. The slits are seen to have a width which preferably can range from about 0.25 mm to 1.5 mm and a length of preferably about 5 to 15 mm.

The shape and placement of the slits importantly cause the slurry to be intimately mixed with steam external to the nozzle 10 immediately upon exiting of the nozzle 10 causing, it is believed, the slurry to be atomized into a spray of very fine droplets.

An advantage of this first embodiment is that the angle of dispersion of the slurry spray is low or even close to zero which allows for the spray to be focused in those applications that require careful control or placement of the spray. Also, the steam exit vector is co-axial with the slurry exit vector which avoids excessively turbulent mixing.

Figure 4:
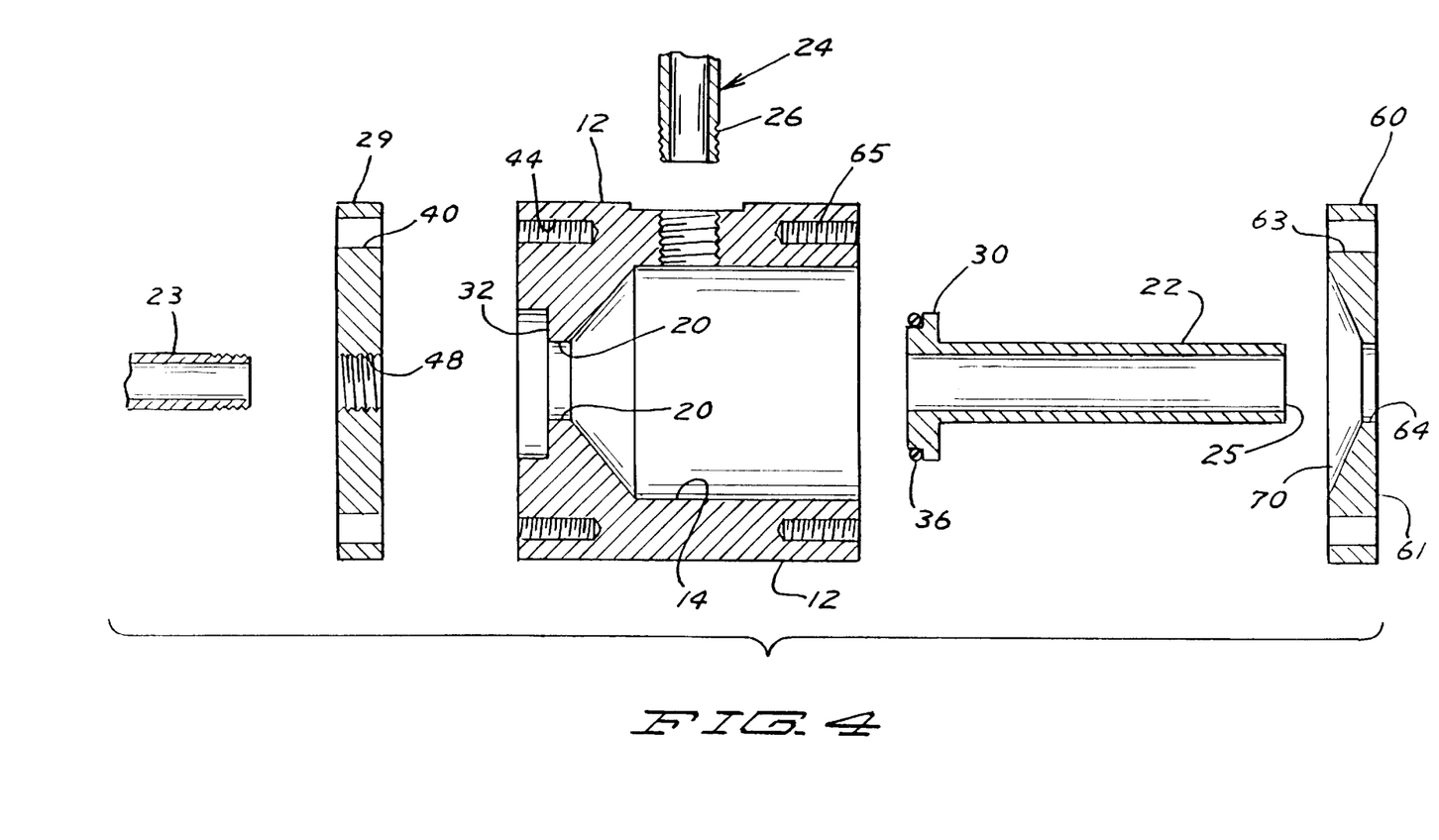
FIG. 4 is a sectional exploded view of the nozzle with the bolts removed.

Reference now is made briefly to FIG. 4 which shows the above described nozzle components in an exploded view.

Figure 5:
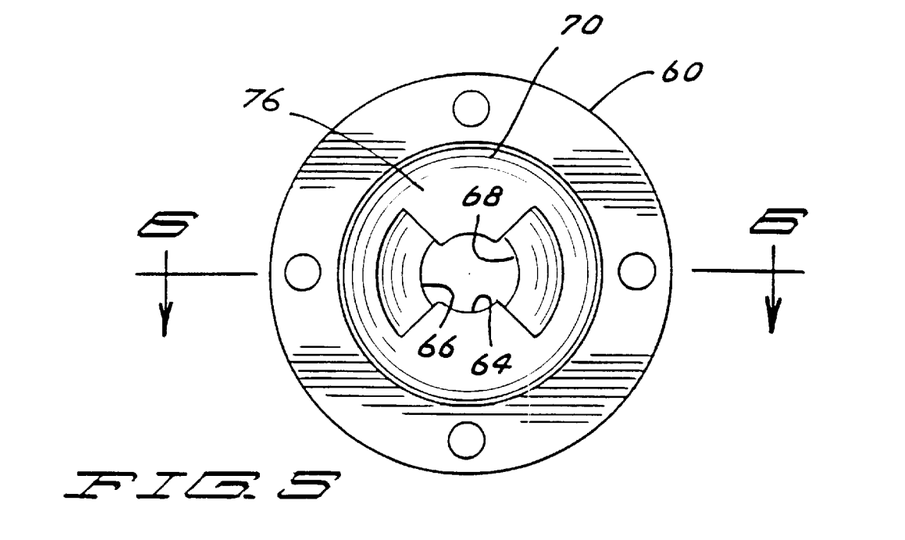
FIG. 5 is a cross sectional view taken along lines 5—5 of FIG. 1 showing the interior surface of the discharge cap.
Figure 6:
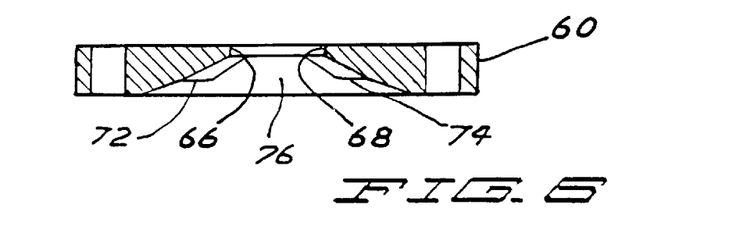
FIG. 6 is a cross sectional view of the end cap taken along lines 6—6 of FIG. 5.

Reference now is made to FIGS. 5 and 6 which show the interior surface 70 of discharge cap 60. FIG. 6 shows that the interior surface 70 is preferably fabricated with shallow fan cuts 72 and 74 proximate each steam slit 66 and 68 for guiding the steam as it exits from the steam reservoir. The fan cuts are deepest as they terminate in the arcuate slit and are progressively shallower as the fan cut extends outwardly from the center. The fan cut(s) assists in the development of an evenly shaped cone pattern to the slurry spray and minimizes condensate build-up. The inner surface 70 of the cap 60 includes a shallow (e.g., 15° to 20°) frusto-conical cut 76 for directing the steam to the arc slits 66 and 68.

In order to change the rate of flow of the steam, a simple valve upstream is opened/closed to regulate steam flow rates.

In the present nozzle design, regulation of the coating solution flow rates can be accomplished simply by substituting one slurry delivery tube 22 having a larger or smaller inner diameter as desired. An advantage of the present nozzle design is that such a substitution is easily made by removing the retaining inlet cap and substituting a tube 22 having a different, desired size internal diameter ("ID"). The flared nozzle insert is characterized by an inner diameter opening size. The nozzle insert is simply substituted with a nozzle insert having a different, desired size ID. By adjusting the output of the coating solution by using differently sized inserts, the shape of the steam outlet remains the same and thus relatively easy to control.

Figure 7:
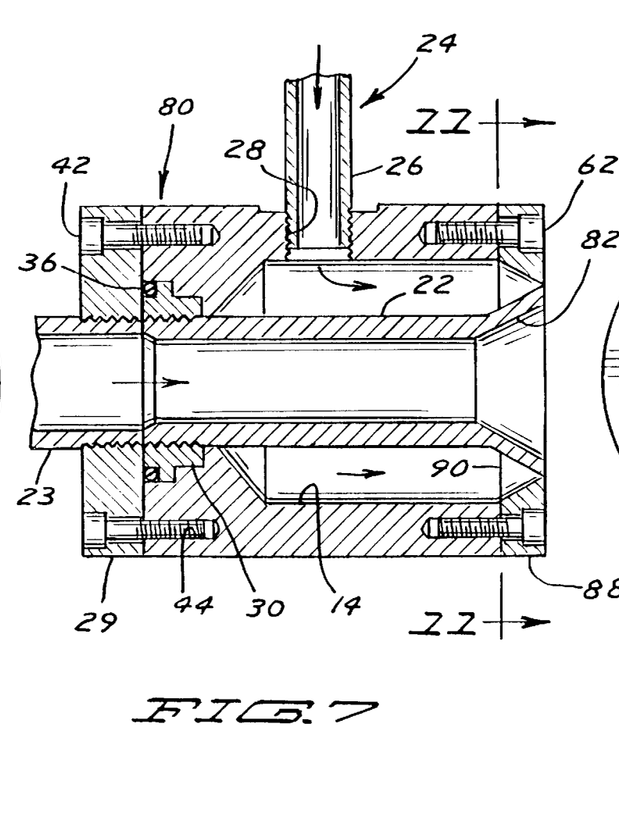
FIG. 7 is a cross sectional view taken along lines 7—7 of FIG. 8 of a second preferred embodiment of the present steam nozzle.

Reference is now made to FIGS. 7–11 which show a second, preferred embodiment similar in most aspects to the first embodiment and characterized in that the nozzle 80 is provided with a flared slurry delivery tube for a wider spray pattern. As can be seen, the basic configuration of nozzle 80 is similar to that described for nozzle 10. However, in this embodiment, FIG. 7 shows that the slurry delivery tube includes a flared outlet portion 82. In the more highly preferred embodiment depicted, the flared outlet portion 82 is oval in shape rather than a less preferred circular shape. The oval shape of the flared outlet imparts an oval pattern to the discharge spray while a circular shape imparts a cone spray. An oval spray pattern or cone is preferred to fan spray since fan sprays tend to get a heavier spray load in the ends of the pattern rather than at the middle.

Figure 8:
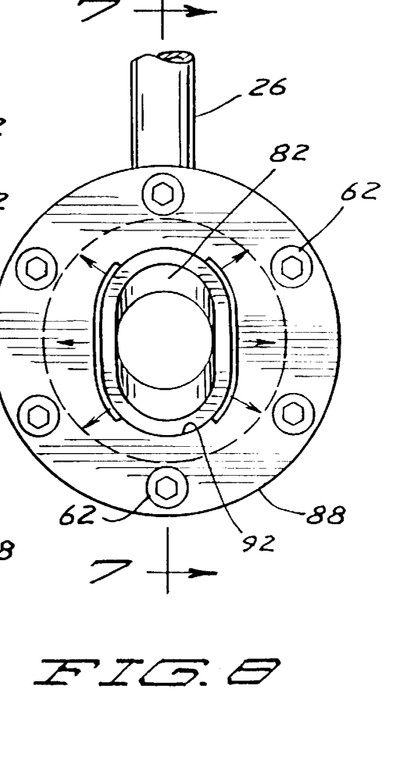
FIG. 8 is an end view of the steam nozzle showing the discharge cap.
Figure 9:
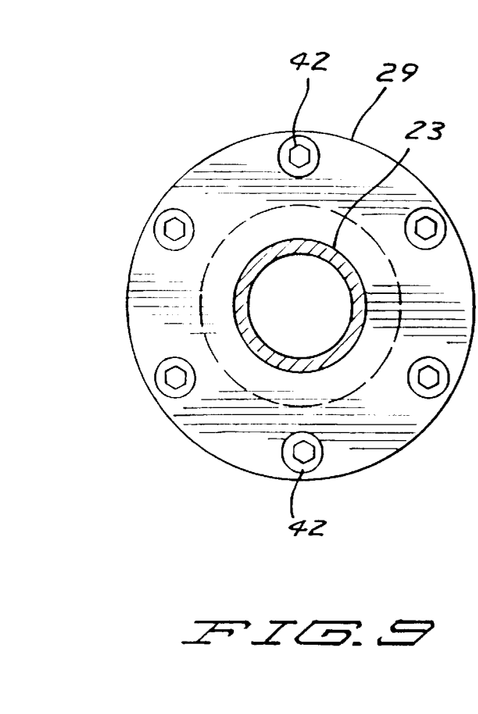
FIG. 9 is an opposed end view of the steam nozzle showing the inlet end.

Reference is now made to FIG. 8 which shows that another feature of the oval shape is that the steam discharge arcuate slits begin to curve around the edge of the coating spray. Such a construction importantly minimizes the tendency of the coating spray to form a mist. The relatively larger slits also even out the distribution of the coating spray without causing misting. Misting is a problem to be avoided since the mist tends to travel and drift. Rather than being applied to the surface of the R-T-E cereal as desired, misting causes coating solution loss and undesirable coating solution building on processing equipment.

Figure 11:
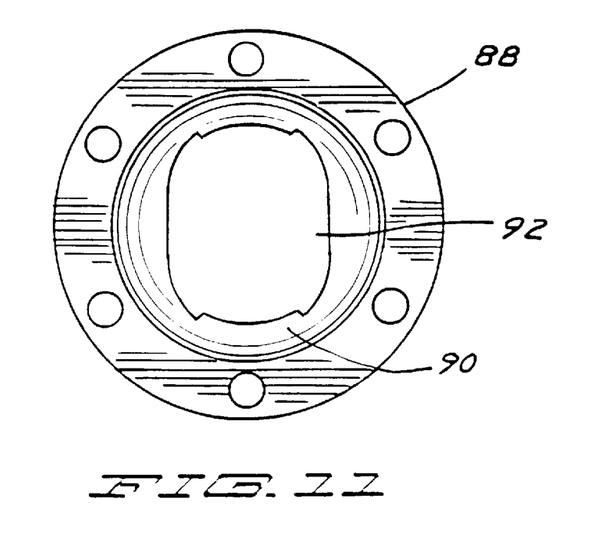
FIG. 11 is a cross sectional view of the end cap taken along lines 11—11 of FIG. 7.

Reference is now made to FIG. 11 which shows the interior surface 90 of discharge cap 88. FIG. 11 shows clearly that the aperture 92 is oval in shape to receive the flared end of the flared slurry discharge tube.

An advantage of the second embodiment having the flared ended supply tube is that the angle of dispersion of the slurry spray is quite high (e.g., 120° for the embodiment depicted) leading to a higher extent of dispersion which can be particularly desirable when large amounts of sugar coating are applied to the cereal base.

Conveniently, the second nozzle embodiment can be rapidly adjusted to modify the amount of slurry to be applied by substituting a discharge slurry tube having a lower or greater internal diameter as desired similar to that for the first embodiment.

In a minor variation, either embodiment can additionally include a second fluid supply member if more than one coating fluid is desired to be applied. For example, one supply may be for a sugar syrup while a second may supply an edible oil or other fluid.

While the nozzles 10 and 80 can be used in a wide variety of coating equipment, in a preferred embodiment, the nozzles 10 and 80 are mounted in cereal enrober 100 including rotating drum 102 in substitution for conventional hydrostatically operated nozzles. Nozzles 10 and 80 are directed towards the product bed and more preferably towards the fastest moving portion of the product bed, i.e. near the top. Of course, the relative position of the product bed will vary depending upon the rotational direction of enrober 100. Specifically, the product will travel up the internal surface of drum 102 due to its rotation before falling back, with the product bed extending from between about the five to nine o'clock positions for clockwise rotation and from between about the seven to three o'clock positions for counterclockwise rotation in the preferred form.

In other aspects of the present invention, the invention generally resides in and provides a moisture film on the cylindrical internal surface of drum 102 and specifically intermediate the cylindrical internal surface of drum 102 and the food product being tumbled inside. Specifically, in the preferred embodiment, a plurality of axially spaced, atomizing water spray nozzles 116 are mounted to support structure 114 for spraying atomized water onto the cylindrical internal surface of drum 102 at a location above the food product being tumbled inside. It has been found that the position where the water is sprayed on drum 102 is not critical as long as it is above the food product bed such that it engages and covers the cylindrical internal surface of drum 102. Nozzles 116 should be selected to provide a wide, fine spray pattern at very small flow rates. Nozzles 116 in the most preferred form are Spraying System Nozzles model 11005-1/4 J-SS with spray set up number SU13-SS.

Air pressure to nozzles 116 in the preferred form is controlled by one regulator for all nozzles 116 and is set from 10–25 psig (60–150 KPa) with a flow around 2 standard cubic feet (0.05663 cubic meters) per minute per nozzle 116. In the most preferred form, water pressure to each nozzle 116 is controlled by individual water regulators which are normally set from 5–15 psig (30–90 KPa) with a flow of 0.7 to 1 gallons (2.65 to 3.785 liters) per hour per nozzle 116 depending on the particular enrober 100 and which product is being topically coated. It can then be appreciated that water flow can be adjusted for different axial lengths along drum 102 according to the preferred teachings of the present invention. For example, the nozzle (s) 116 in the area where topical coatings in the form of particulates are dispensed can be adjusted to increase water flow to keep the particulates from sticking to drum 102, with particulates traditionally posing difficult build-up problems. Water can be supplied from conventional sources such as directly off a city water header, but it is recommended that the water be filtered to prevent plugging of nozzles 116.

Water sprayed by nozzles 116 can be hot or cold, with temperature not seeming to be a factor in operation. In this regard, water could be sprayed on the cylindrical internal surface of drum 102 in the form of steam sprayed by nozzles 116 instead of water and compressed air. However, steam in specific applications is less preferred for safety and control reasons. Specifically, steam involves using very hot supply lines to which the operator is exposed especially when making adjustments. Further, especially at low flow rates according to the present invention, steam is hard to control. Also, excessive moisture build-up can occur due to steam condensation while nozzles 116 are cold during initial coming up.

In still other aspects of the present invention, the invention generally resides in the material forming the internal surface of drum 102. Specifically, in the preferred embodiment, drum 102 is formed of a material of a hydrophobic nature. Since the slurry is a water-based solution, drums 102 having at least an internal surface formed of hydrophobic materials help prevent build-up. Further, in the most preferred form, drum 102 is formed of a plastic having a low coefficient of friction at the cylindrical internal surface of drum 102 providing low-stick characteristics relative to the build-up of topical coatings and product therein. Due to these hydrophobic and low-stick characteristics, build-up problems on the cylindrical internal surface of drum 102 are virtually eliminated. In the event of build-up requiring cleaning, drum 102 is extremely quick and easy to clean. Specifically, it has been found that only 15 minutes are required to wash clean drum 102 according to the present invention using a high-pressure, hot-water hose, whereas previously 1–3 hours were required to scrape clean drums 102 as conventionally formed from steel.

In the preferred form of the present invention, drum 102 is formed of molded high-density polyethylene (HDPE). Although the use of ultra-high molecular weight polyethylene (UHMW) has been previously suggested for use in nonconventionally shaped enrobers, its use in enrobers 100 according to the teachings of the present invention was not possible. Further, although UHMW and HDPE are in the same polyethylene family having very similar mechanical properties, the use according to the teachings of the present invention of HDPE produces surprising, unexpected results when utilized in drum 102 having a generally cylindrical internal surface of the type of the preferred embodiment because of some subtle differences. Specifically, these key differences in mechanical properties between HDPE and UHMW include: tensile strength, percent of elongation, and continuous duty operating temperature. On average, the tensile strength of HDPE is approximately 43% higher than UHMW. This allows drum 102 to be much stronger and thus more durable. The HDPE will not be as susceptible to shock loads or stress failures. Also, the percent of elongation of HDPE is much lower than UHMW, providing for a more dimensional stable drum 102 for use in varying environmental conditions. This implies that the HDPE will not shrink and expand as drastically as UHMW, thus making it less susceptible to stress or fatigue failure. Further, the thermal capacity of HDPE is much higher than UHMW. HDPE is capable of continuous operation in an environment up to 250° F. (120° C.), while UHMW is only functional for continuous duty up to 120° F. (50° C.) (with 180° F. (82° C.) being the threshold where breakdown of mechanical properties begins). Finally, UHMW is typically commercialized in sheets making formation by molding more difficult.

The significance of these differences concerns the temperature of the topical coating upon application to the food base. Of course, the temperature at which all the sugar in a solution is dissolved will increase as the percentage of solids is increased. Sugar syrups utilized as topical coatings having about 10%–12% moisture will have total solids dissolved at about 250° F. (120° C.). Total dissolution of solids is important to minimization of a frosted appearance which can occur upon subsequent drying when undissolved solids act as nuclei for crystal formation. This is why the topical coating even though held at high temperatures undergoes a final heating step immediately prior to application onto the food base. Even with only 10%–12% moisture in the topical coating, the coated food base generally requires a final drying step to remove this moisture. It would be desirable to utilize an even lower moisture topical coating so as to eliminate the need for the final drying step (the food base would be adjusted slightly with regard to its moisture content such that upon equilibrium the finished product would have an equivalent moisture). Going to a lower moisture topical coating would mean that the application temperature of the topical coating would necessarily be even higher than at the 10% moisture level. Thus, the tensile strength and operating temperature condition of drum 102 is critical to minimization of subsequent drying.

In the most preferred form of the present invention, drum 102 is formed of a thin wall in a generally cylindrical shape to form the continuous cylindrical internal surface. In the most preferred form, lifters 110 are integrally formed by bending the thin wall forming drum 102 to divide drum 102 into a plurality of circumferentially spaced arcuate portions 118 interconnected together by lifters 110. In the preferred form, lifters 110 generally include a first axially extending leg 120 having a first axially extending edge integrally connected to the trailing edge of arcuate portion 118 and a second axially extending edge. Lifters 110 further include a second axially extending leg 122 having a first axially extending edge integrally connected to the second axially extending edge of leg 120 and a second axially extending edge integrally connected to the leading axially extending edge of the next circumferentially adjacent arcuate portion 118. The trailing edges of arcuate portions 118 and the first axially extending edges of legs 120 are circumferentially spaced from and parallel to the leading edges of arcuate portions 118 and the second axially extending edges of legs 122. Leg 120 extends generally perpendicular to leg 122 and has a width between its first and second axially extending edges which is less than one-half of the width between the first and second axially extending edges of leg 122 and specifically is 40% of the width between the first and second axially extending edges of leg 122. The circumferential width between the leading and trailing edges of arcuate portions 118 is a multiple and in the most preferred form is slightly less than 4 times the circumferential width between the first axially extending edge of leg 120 and the second axially extending edge of leg 120. Rotation of drum 102 is in a direction that the leading edges of arcuate portions 118 proceed the trailing edges such that legs 120 present abutment areas extending approximately 25° from radial and legs 122 present slide areas for gently sliding the food pieces to the next arcuate portion 118. In the most preferred form, drum 102 has a wall thickness of 0.50 inches (1.27 cm).

OPERATION OF THE INVENTION

In its method aspect, nozzles 10 and 80 co-spray at least one coating fluid onto a food substrate with steam to form an atomized intermixing spray of coating solution and steam onto a food base. The methods find particular suitability for use in connection with the sugar coating of an R-T-E cereal. While the R-T-E cereal base can comprise a puffed cereal, a shred cereal, a biscuit, and the like, the present methods are especially useful for R-T-E cereal base in the form of flakes. In certain preferred embodiments, the present methods are practiced employing nozzles 10 and 80 to provide advantages in terms of ability to adjust and control solution application features such as flow rate and spray pattern through simple and convenient interchange of nozzle pieces.

If desired, a second or additional coating fluid can also be simultaneously supplied along with the sugar slurry, e.g., a vitamin supply, so as to minimize losses through heating or other handling of expensive and sensitive vitamin ingredients.

While the sugar solution and steam are co-sprayed from a single nozzle 10 or 80, the enrober 100 can be provided with a plurality of such nozzles 10 and 80. For example, a first bank or array of two nozzles 10 or 80 can be positioned within drum 102 near the inlet end and a second bank of two nozzles 10 or 80 can be mounted within drum 102 near the discharge end of enrober 100. Also, intermediate banks of nozzles 10 or 80 can be mounted within enrober 100.

The sugar slurry is preferably supplied to the nozzle 10 or 80 as a hot solution ranging from 250° to 270° F. (121° to 132° C.), preferably about 255° to 265° F. (124° to 130° C.) so as to maximize dissolution of any sugar crystals which can adversely affect the finished products appearance.

The steam can be either wet, dry or even superheated steam ranging from about 4 to 70 psig (24 to 420 KPa), preferably about 10 to 50 psig (60 to 300 KPa). The amount of steam consumed is not large and a wide variety of steam consumption rates per pound of sugar solution are useful.

The food product piece can be any food substrate typically enrobed or partially coated with a sugar solution.

Especially useful as the food substrate are R-T-E cereals, whether flakes, puffed pieces, biscuits, shreds and mixtures thereof. The amount of sugar slurry applied to the food base can range broadly from about 1 to 150:100, preferably about 50 to 120:100.

In another variation, particulate matter can be added to enrober 100 for adhering the particulate matter to the external surface of the R-T-E cereal pieces. Particulate matter can include fruit pieces, granola, seed bits, candy bits, bran and mixtures thereof. The particulate material upon finish drying of the R-T-E cereal adheres to the external surface due to the coating action of the sugar slurry.

Alternately or in addition to nozzles 10 and 80, nozzles 116 can be utilized to spray atomized water onto the cylindrical internal surface of drum 102. In its method aspect, the present invention broadly resides in providing a thin film of water acting as a renewable surface barrier between the product and the cylindrical internal surface of drum 102. Specifically, it has been found that water applied by nozzles 116 at rates in the range of 0.6 to 1.0 gallons (2.25 to 3.785 liters) per hour which equated to less than one-half of one percent of the rate at which the topical coating slurry was applied was effective in keeping drum 102 clean and in fighting build-up problems. The results of the use of nozzles 116 according to the present invention have been greater than what was expected. Specifically, at present, run times are 10 times as long when utilizing nozzles 116 than without nozzles 116. For example, in the past, enrobers 100 were shut down for cleaning at least once every shift. With nozzles 116 of the present invention, enrobers 100 are run from three to four days at a stretch. Even when cleaning after three or four days, drums 102 have only one-tenth the build-up as they had after only a single shift without nozzles 116 of the present invention. It was also found that by reducing the water flow, a thin build-up can be maintained if desired on the cylindrical inner surface of drum 102 to enhance tumbling in sections of drum 102 not including lifters 110. It is also important to avoid excessive water addition and to avoid spraying water from nozzles 116 onto the product bed for the reason that excessive moisture will cause the puffed products to shrink, perhaps as much as to their original unpuffed size.

According to the most preferred teachings of the present invention, plastic, hydrophobic drums 102 are utilized in enrobers 100 to provide a first defense in preventing build-up on the cylindrical internal surface of drum 102. If build-up problems continue to exist, such as the result of applying particulates as a topical coating, and/or if conventional stainless steel drums 102 are utilized, additional moisture can be provided to enrober 100 utilizing nozzles 10 or 80 and/or nozzles 116 according to the preferred teachings of the present invention.

The sugar slurry can employ conventional sugar coating compositions containing about 80% to 90% sugar(s) and the balance moisture. Some sugar coating compositions optionally additionally include modest levels of an edible oil (e.g., 0.1% to 8%). The sugar slurry can also include colorants, vitamins and other conventional additives. The sugar coating can be supplied at a pressure ranging from about 50 to 150 psig (300 to 900 KPa).

However, another dramatic improvement according to the present invention resides in the sugar slurry that can be used. In conventional sugar coating compositions, the slurry had a 17% moisture content. This added moisture is then removed in the subsequent drying step. With the present invention, the moisture content of the slurry can be reduced to about 10%. This has effectively resulted in an increase in dryer capacity of about 40% since the moisture addition has been reduced by 40%. Dryer capacity has been the traditional bottleneck in processing operations. Also, a typical dryer requires a considerable capital expenditure. Thus, for the minimal capital expenditure required for the present invention, the capital expenditure required for dryers is substantially reduced, with dryers having increased throughput.

The benefits of reduced moisture slurry are especially useful in the summertime when the ambient air contains high absolute humidity. During these conditions, larger volumes of air must pass through the dryer to remove the same quantity of moisture, due to the air's reduced ability to pick up additional moisture. Heating these larger air volumes consumes substantially more energy and can result in reduced production rates if sufficient energy transfer can not be accomplished by the dryer.

By using lower moisture slurry, less water is introduced into the dryer, and hence less needs to be removed, thereby reducing the dryer energy demand while maintaining normal production rates. This saves energy cost, and reduces the need for higher capital expenditures for larger dryers to handle summertime conditions.

Without the present invention, use of low moisture slurry (10% moisture) is impossible because it leads to severe fouling of enrober 100 in about 20 to 30 minutes, even under the best operating conditions.

Surprisingly, even low moisture solutions, e.g., 3% to 10% moisture, may also be employed. Of course, this would result in near tripling of dryer capacity. It is believed that nozzles 10 and 80 are especially helpful for applying the super concentrated slurry as the steam helps to splatter the slurry onto the product bed.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Method of applying a topical coating to an exterior surface of multiple pieces of a food base, comprising the steps of: delivering a quantity of the food base to a tumbling vessel; dispensing the topical coating onto the food base in the tumbling vessel, wherein the dispensing step comprises the step of dispensing the topical coating as a slurry in the form of a water-based solution; providing moisture in addition to the topical coating in the tumbling vessel; and tumbling the food base in the tumbling vessel simultaneously as the topical coating is being dispensed and as the moisture is being provided to form a topically coated food base; wherein the delivering step comprises the step of delivering the quantity of the food base to a thin-walled, generally cylindrical tumbling vessel having a continuous, generally cylindrical internal surface formed of hydrophobic material in the form of high-density polyethylene having a low coefficient of friction obtaining a low-stick characteristic with the topically coated food base.

2. Method of applying a topical coating to an exterior surface of multiple pieces of a food base, including the steps of: delivering a quantity of the food base as a bed on a continuous inner surface of a tumbling vessel, dispensing the topical coating onto the food base in the tumbling vessel, providing moisture in addition to the topical coating in the tumbling vessel, and rotating the tumbling vessel to tumble the food base in the tumbling vessel simultaneously as the topical coating is being dispensed and as the moisture is being provided, wherein the providing step comprises the step of providing the moisture as a thin film of water onto the continuous inner surface of the tumbling vessel above the bed, with the thin film of water acting as a renewable barrier between the continuous inner surface and the bed to keep the continuous inner surface of the tumbling vessel clean and to fight build-up problems.

3. The method of claim 2 wherein the providing step comprises the step of spraying the moisture onto the continuous inner surface of the tumbling vessel.

4. The method of claim 3 wherein the spraying step comprises the step of spraying steam.

5. The method of claim 3 wherein the spraying step comprises the step of spraying air atomized water.

6. The method of claim 2 wherein the delivering step comprises the step of delivering the quantity of the food base to a thin-walled, generally cylindrical tumbling vessel having a continuous, generally cylindrical internal surface formed of hydrophobic material in the form of high-density polyethylene having a low coefficient of friction obtaining a low-stick characteristic with the topically coated food base.

7. The method of claim 6 wherein the delivering step comprises the step of delivering the quantity of the food base to the tumbling vessel including a plurality of circumferentially spaced arcuate portions interconnected by lifters, with each of the arcuate portions including a leading edge and a trailing edge circumferentially spaced from and parallel to the leading edge and each of the lifters including a first edge and a second edge circumferentially spaced from and parallel to the first edge, with the first edges being connected to the trailing edges and the second edges being connected to the leading edges, with the leading edges proceeding the trailing edges, with the circumferential spacing between the leading edge and the trailing edge being substantially larger than the circumferential spacing between the first edge and the second edge.

8. The method of claim 6 wherein the delivering step comprises the step of delivering the quantity of the food base to the tumbling vessel wherein the lifters each include a first leg having the first edge and a third edge circumferentially spaced from and parallel to the first edge and a second leg having a fourth edge integrally connected to the third edge and the second edge circumferentially spaced from and parallel to the fourth edge, with the width between the first edge and the third edge being less than approximately one-half of the width between the fourth edge and the second edge.

9. The method of claim 2, 3 or 6 additionally comprising the step of: finish drying the topically coated food base to a final moisture content of about 2% to 6%.

10. The method of claim 2 additionally comprising the step of admixing a quantity of particulate material to the tumbling vessel to adhere the particulate material to the food base.

11. The method of claim 10 wherein the particulate material comprises fruit pieces, seed pieces, bran, hard candy pieces, granola and mixtures thereof.

12. Apparatus for applying a topical coating to an exterior surface of multiple pieces of a food base, comprising, in combination: a vessel for tumbling a quantity of the food base, with the vessel including an inlet and a discharge end; means for dispensing the topical coating onto the food base in the vessel, wherein the dispensing means dispenses the topical coating as a slurry in the form of a water-based solution; and means for providing moisture in addition to the topical coating in the vessel, with the topical coating being dispensed and the moisture being provided as the food base is tumbled in the vessel to form a topically coated food base; wherein the vessel is thin-walled and generally cylindrically shaped having a continuous, generally cylindrical internal surface formed of hydrophobic material in the form of high-density polyethylene having a low coefficient of friction obtaining a low-stick characteristic with the topically coated food base.

13. The apparatus of claim 12 wherein the vessel includes a plurality of circumferentially spaced arcuate portions interconnected by lifters, with each of the arcuate portions including a leading edge and a trailing edge circumferentially spaced from and parallel to the leading edge and each of the lifters (110) including a first edge and a second edge circumferentially spaced from and parallel to the first edge, with the first edges being connected to the trailing edges and the second edges being connected to the leading edges, with the leading edges proceeding the trailing edges, with the circumferential spacing between the leading edge and the trailing edge being substantially larger than the circumferential spacing between the first edge and the second edge.

14. Apparatus for applying a topical coating to an exterior surface of multiple pieces of a food base, comprising, in combination: a vessel for tumbling a quantity of the food base, with the vessel including an inlet and a discharge end, with the quantity of the food base being held as a bed on a continuous inner surface of the vessel, with the quantity of food base being tumbled by rotating the continuous inner surface; means for dispensing the topical coating onto the food base in the vessel; and means for providing moisture in addition to the topical coating in the vessel, with the topical coating being dispensed and the moisture being provided as the food base is tumbled in the vessel, wherein the providing means comprises means for providing the moisture as a thin film of water onto the continuous inner surface of the vessel above the bed, with the thin film of water acting as a renewable barrier between the continuous inner surface and the bed to keep the continuous inner surface of the vessel clean and to fight build-up problems.

15. The apparatus of claim 14 wherein the providing means comprises means for spraying the moisture onto the continuous inner surface of the tumbling vessel.

16. The apparatus of claim 15 wherein the spraying means comprises means for spraying steam.

17. The apparatus of claim 15 wherein the spraying means comprises means for spraying air atomized water.

18. The apparatus of claim 14 wherein the vessel is thin-walled and generally cylindrically shaped having a continuous, generally cylindrical internal surface formed of hydrophobic material in the form of high-density polyethylene having a low coefficient of friction obtaining a low-stick characteristic with the topically coated food base.

19. The apparatus of claim 18 wherein the vessel includes a plurality of circumferentially spaced arcuate portions interconnected by lifters, with each of the arcuate portions including a leading edge and a trailing edge circumferentially spaced from and parallel to the leading edge and each of the lifters including a first edge and a second edge circumferentially spaced from and parallel to the first edge, with the first edges being connected to the trailing edges and the second edges being connected to the leading edges, with the leading edges proceeding the trailing edges, with the circumferential spacing between the leading edge and the trailing edge being substantially larger than the circumferential spacing between the first edge and the second edge.

20. The apparatus of claim 19 wherein the lifters each include a first leg having the first edge and a third edge circumferentially spaced from and parallel to the first edge and a second leg having a fourth edge integrally connected to the third edge and the second edge circumferentially spaced from and parallel to the fourth edge, with the width between the first edge and the third edge being less than approximately one-half of the width between the fourth edge and the second edge.

21. Apparatus for applying a topical coating to an exterior surface of multiple pieces of a food base comprising, in combination: a vessel for tumbling a quantity of the food base, with the vessel including an inlet and a discharge end; and means for dispensing the topical coating onto the food base in the vessel, with the topical coating being dispensed as the food base is tumbled in the vessel to form a topically coated food base, wherein the vessel is thin-walled and generally cylindrically shaped having a continuous, generally cylindrical internal surface formed of hydrophobic material in the form of high-density polyethylene having a low coefficient of friction obtaining a low-stick characteristic with the topically coated food base.

22. The apparatus of claim 21 wherein the vessel includes a plurality of circumferentially spaced arcuate portions interconnected by lifters, with each of the arcuate portions including a leading edge and a trailing edge circumferentially spaced from and parallel to the leading edge and each-of the lifters including a first edge and a second edge circumferentially spaced from and parallel to the first edge, with the first edges being connected to the trailing edges and the second edges being connected to the leading edges, with the leading edges proceeding the trailing edges, with the circumferential spacing between the leading edge and the trailing edge being substantially larger than the circumferential spacing between the first edge and the second edge.

23. The apparatus of claim 22 wherein the lifters each include a first leg having the first edge and a third edge circumferentially spaced from and parallel to the first edge and a second leg having a fourth edge integrally connected to the third edge and the second edge circumferentially spaced from and parallel to the fourth edge, with the width between the first edge and the third edge being less than approximately one-half of the width between the fourth edge and the second edge.

\* \* \* \* \*